US011316624B2

(12) United States Patent
Yu et al.

(10) Patent No.: US 11,316,624 B2
(45) Date of Patent: Apr. 26, 2022

(54) SIDELINK FEEDBACK FOR GROUPCAST

(71) Applicant: Nokia Technologies Oy, Espoo (FI)

(72) Inventors: Ling Yu, Kauniainen (FI); Vinh Van Phan, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 116 days.

(21) Appl. No.: 16/743,393

(22) Filed: Jan. 15, 2020

(65) Prior Publication Data
US 2020/0235868 A1    Jul. 23, 2020

Related U.S. Application Data (60) Provisional application No. 62/794,174, filed on Jan. 18, 2019.

(51) Int. Cl.
*H04L 1/18* (2006.01)
*H04W 76/28* (2018.01)
(Continued)

(52) U.S. Cl.
CPC .......... *H04L 1/1819* (2013.01); *H04L 5/0055* (2013.01); *H04W 4/08* (2013.01);
(Continued)

(58) Field of Classification Search
CPC . H04L 1/1819; H04L 5/0055; H04L 12/1886; H04L 1/1812; H04L 1/1861;
(Continued)

(56) References Cited

U.S. PATENT DOCUMENTS

2015/0249544 A1 * 9/2015 Cho ................... H04L 12/1886
                                                         370/312
2017/0215183 A1 * 7/2017 Gulati .................. H04L 1/1812
(Continued)

FOREIGN PATENT DOCUMENTS

WO    2017/083388 A1    5/2017
WO    2017/155332 A2    9/2017
(Continued)

OTHER PUBLICATIONS

"Discussion on physical layer procedures in VR V2X" 3GPP TSG RAN WG1 Meeting AH 1901, R1-1900648, Agenda: 7.2.4.1.2, LG Electronics, Jan. 21-25, 2019, 10 pages (Year: 2019).*
(Continued)

*Primary Examiner* — Ayaz R Sheikh
*Assistant Examiner* — Louis Samara
(74) *Attorney, Agent, or Firm* — Squire Patton Boggs (US) LLP (57) ABSTRACT

Systems, methods, apparatuses, and computer program products for new radio (NR) sidelink (SL) hybrid automatic repeat request (HARQ) feedback are provided. One method may include monitoring, by a user equipment in sidelink groupcast configured with two stage hybrid automatic repeat request feedback channels, a first stage hybrid automatic repeat request feedback channel when no physical sidelink control channel and physical sidelink shared channel is received. The method may include sending a discontinuous transmission indicator or hybrid automatic repeat request negative acknowledgement on a second stage hybrid automatic repeat request feedback channel when hybrid automatic repeat request positive acknowledgement/negative acknowledgement is monitored on the first stage hybrid automatic repeat request feedback channel.

17 Claims, 2 Drawing Sheets

(51) Int. Cl.
  *H04L 5/00* (2006.01)
  *H04W 4/08* (2009.01)
  *H04W 24/08* (2009.01)
  *H04W 92/18* (2009.01)

(52) U.S. Cl.
  CPC ........... *H04W 24/08* (2013.01); *H04W 76/28* (2018.02); *H04W 92/18* (2013.01)

(58) Field of Classification Search
  CPC .... H04L 1/1887; H04L 1/1877; H04W 76/28; H04W 4/08; H04W 24/08; H04W 92/18; H04W 52/04; H04W 72/12; H04W 72/1289
  See application file for complete search history.

(56) References Cited

U.S. PATENT DOCUMENTS

| | | | | |
|---|---|---|---|---|
| 2018/0176892 | A1* | 6/2018 | Kim | H04W 52/386 |
| 2019/0052439 | A1* | 2/2019 | Seo | H04W 72/12 |
| 2021/0377912 | A1* | 12/2021 | El Hamss | H04L 1/1877 |
| 2022/0007403 | A1* | 1/2022 | Li | H04W 72/1289 |

FOREIGN PATENT DOCUMENTS

| | | | | |
|---|---|---|---|---|
| WO | 2018/137129 | A1 | 8/2018 | |
| WO | 2018/151637 | A1 | 8/2018 | |
| WO | WO-2018137129 | A1 * | 8/2018 | ........... H04L 1/1864 |
| WO | 2020/061934 | A1 | 4/2020 | |
| WO | WO-2020061934 | A1 * | 4/2020 | ........... H04L 1/1861 |

OTHER PUBLICATIONS

"Revised SID: Study on NR V2X", 3GPP TSG-RAN Meeting #81, RP-182111, Agenda: 9.3.6, LG Electronics, Sep. 10-13, 2018, 6 pages.
"Discussion on Physical Layer Procedure", 3GPP TSG-RAN WG1 Meeting #95, R1-1812365, Agenda: 7.2.4.1.2, MediaTek Inc, Nov. 12-16, 2018, 6 pages.
"Physical Layer Procedures for NR V2X", 3GPP TSG-RAN WG1 Meeting #95, R1-1812649, Agenda: 7.2.4.1.2, NEC, Nov. 12-16, 2018, pp. 1-5.
"Physical Layer Procedure for NR-V2X", 3GPP TSG-RAN WG1 Meeting #95, R1-1812811, Agenda: 7.2.4.1.2, OPPO, Nov. 12-16, 2018, 5 pages.
"Discussion on Physical Layer Procedure for NR V2X", 3GPP TSG-RAN WG1 Meeting #95, R1-1812842, Agenda: 7.2.4.1.2, LG Electronics, Nov. 12-16, 2018, 6 pages.
"Discussion on Physical Layer Procedures", 3GPP TSG-RAN WG1 Meeting #95, R1-1812985, Agenda: 7.2.4.1.2, Samsung, Nov. 12-16, 2018, 6 pages.
"Consideration on Physical Layer Procedures", 3GPP TSG-RAN WG1 Meeting #95, R1-1813075, Agenda: 7.2.4.1.2, Spreadtrum Communications, Nov. 12-16, 2018, 5 pages.
"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.
"3rd Generation Partnership Project; Technical Specification Group Radio Access Network; NR; Medium Access Control (MAC) protocol specification (Release 15)", 3GPP TS 38.321, V15.3.0, Sep. 2018, pp. 1-76.
"Final Report of 3GPP TSG RAN WG1 #95 v1.0.0", 3GPP TSG RAN WG1 Meeting #96, R1-1901482, MCC Support, Feb. 25-Mar. 1, 2019, 1-172.
Yoon et al., "Efficient Feedback Mechanism and Rate Adaptation for LTE-based D2D Communication", IEEE 18th International Symposium on A World of Wireless, Mobile and Multimedia Networks (WoWMoM), Jun. 12-15, 2017, pp. 1-9.
Du et al., "A Compressed HARQ Feedback for Device-to-Device Multicast Communications", IEEE Vehicular Technology Conference (VTC Fall), Sep. 3-6, 2012, 5 pages.
Extended European Search Report received for corresponding European Patent Application No. 20151726.5, dated Jun. 23, 2020, 10 pages.
"Discussion on physical layer procedure for NR V2X", 3GPP TSG RAN WG1 Meeting AH 1901, R1-1900648, Agenda: 7.2.4.1.2, LG Electronics, Jan. 21-25, 2019, 10 pages.
"Discussion on physical layer procedures in NR V2X", 3GPP TSG RAN WG1 Ad-Hoc Meeting 1901, R1-1900321, Agenda: 7.2.4.1.2, CATT, Jan. 21-25, 2019, 6 pages.
"Design and contents of PSCCH and PSFCH", 3GPP TSG RAN WG1 Meeting #95, R1-1813554, Agenda: 7.2.4.1.5, Huawei, Nov. 12-16, 2018, 7 pages.
Communication pursuant to Article 94(3) EPC issued in corresponding European Patent Application No. 20151726.5 dated Oct. 27, 2021.

* cited by examiner

SIDELINK FEEDBACK FOR GROUPCAST

CROSS REFERENCE TO RELATED APPLICATIONS

This application claims priority from US Provisional Application No. 62/794,174, filed on Jan. 18, 2019. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for NR Sidelink (SL).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein.

SUMMARY

In a first aspect thereof the exemplary embodiments of this invention provide a method that comprises monitoring, by a user equipment in sidelink groupcast configured with two stage hybrid automatic repeat request feedback channels, a first stage hybrid automatic repeat request feedback channel when no physical sidelink control channel and physical sidelink shared channel is received; and sending a discontinuous transmission indicator or hybrid automatic repeat request negative acknowledgement on a second stage hybrid automatic repeat request feedback channel when hybrid automatic repeat request positive acknowledgement/negative acknowledgement is monitored on the first stage hybrid automatic repeat request feedback channel.

In a further aspect thereof the exemplary embodiments of this invention provide an apparatus for operating a user equipment that comprises at least one data processor and at least one memory that includes computer program code. The at least one memory and computer program code are configured, with the at least one data processor, to cause the apparatus, at least to monitor, by the apparatus in sidelink groupcast configured with two stage hybrid automatic repeat request feedback channels, a first stage hybrid automatic repeat request feedback channel when no physical sidelink control channel and physical sidelink shared channel is received; and send a discontinuous transmission indicator or hybrid automatic repeat request negative acknowledgement on a second stage hybrid automatic repeat request feedback channel when hybrid automatic repeat request positive acknowledgement/negative acknowledgement is monitored on the first stage hybrid automatic repeat request feedback channel.

In another aspect thereof the exemplary embodiments of this invention provide an apparatus that comprises at least one data processor and at least one memory that includes computer program code. The at least one memory and computer program code are configured, with the at least one data processor, to cause the apparatus, at least to configure two stage hybrid automatic repeat request feedback channels for a sidelink groupcast; and configure at least one user equipment of the sidelink groupcast to monitor a first stage of the two stage hybrid automatic repeat request feedback channels when the user equipment does not receive physical sidelink control channel and physical sidelink shared channel for the sidelink groupcast.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for NR Sidelink (SL), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

As will be discussed in more detail, certain embodiments relate to 3GPP NR SL, for example, in 3GPP Release-16 and beyond. NR SL is envisioned to provide high reliability and low latency communication (HRLLC) over SL. One application can be to support, for example, advanced vehicle-to-everything (V2X) use cases. NR SL can support different casting types including, for example, unicast, groupcast, and broadcast.

NR SL can support hybrid automatic repeat request (HARQ) feedback not only for unicast but also for groupcast. When SL HARQ feedback is enabled for groupcast, the following operations options may be used for receiver UE (Rx UE) to transmit HARQ feedback. As a first option, the Rx UE transmits HARQ-non-acknowledgement (NACK) on physical sidelink feedback channel (PSFCH) if it fails to decode the corresponding transport block (TB) after decoding the associated physical sidelink control channel (PSCCH). It transmits no signal on PSFCH otherwise.

As a second option, the receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE.

The first option discussed above, in which the receiver UE transmits HARQ-NACK on PSFCH if it fails to decode the corresponding TB after decoding the associated PSCCH, has the problem of identifying DTX (i.e., receiver (Rx) UE didn't receive physical sidelink shared channel (PSSCH) due to miss of PSCCH and therefore did not transmit HARQ NACK to Tx UE for requesting HARQ retransmission).

The second option discussed above, in which the receiver UE transmits HARQ-ACK on PSFCH if it successfully decodes the corresponding TB, assumes that each Rx UE has dedicated PSFCH resources so that the Tx UE can identify how many HARQ ACKs and NACKs are received. If the number of UEs in the groupcast is known by the Tx UE, then the Tx UE can also identify DTX from the Rx UE based on the number of ACKs and NACKs received. However, having dedicated PSFCH resources for each Rx UE in the groupcast requires not only more resources for transmitting HARQ feedback but also a more complicated mechanism to allocate the dedicated resources and handle the potential confliction of the PSFCH resources in UE autonomous resource allocation mode. To solve these problems, all the RX UEs in the groupcast may share the same PSFCH resources for transmitting HARQ ACK/NACK. However, in this case, the DTX issue will become a problem again as the Tx UE cannot identify the number of ACKs/NACKs and thus is not able to detect the DTX.

Example embodiments provide a two stage HARQ feedback mechanism to solve at least the problems discussed above including, for example, how to efficiently provide HARQ feedback for groupcast and/or how to effectively identify the DTX for more robust SL HARQ operation of groupcast.

Based on the principle that a Rx UE may identify the miss of a PSCCH by detecting the HARQ ACK/NACK of other Rx UEs in the same SL groupcast communication, certain embodiments provide a two stage HARQ feedback method to facilitate at least the HARQ DTX detection and indication.

According to an embodiment, the two stage HARQ feedback channels may be configured for the SL groupcast, for instance, either during groupcast communication establishment and/or when the Rx UE joins the SL groupcast. In one example, the configured stage 1 HARQ feedback channel may be shared by all the Rx UEs in the groupcast and the stage 2 feedback channel may be either shared by all the UEs or dedicated to each individual UE in the groupcast.

In an embodiment, the Rx UE may be configured to monitor the stage 1 HARQ feedback channel if Rx UE does not detect PSCCH to indicate there is SL data transmission on PSSCH for the groupcast. If the Rx UE detects HARQ ACK/NACK transmitted on stage 1 feedback channel, the Rx UE may send the DTX or HARQ NACK on stage 2 feedback channel to trigger the HARQ retransmission from Tx UE. As an optional feature, in one example, the Rx UE may not transmit DTX/HARQ NACK on stage 2 feedback channel if the Rx UE detects HARQ NACK in stage 1 feedback channel from the other Rx UE in the groupcast as HARQ retransmission will be triggered anyway by the HARQ NACK on stage 1 feedback channel.

Figure 1A:
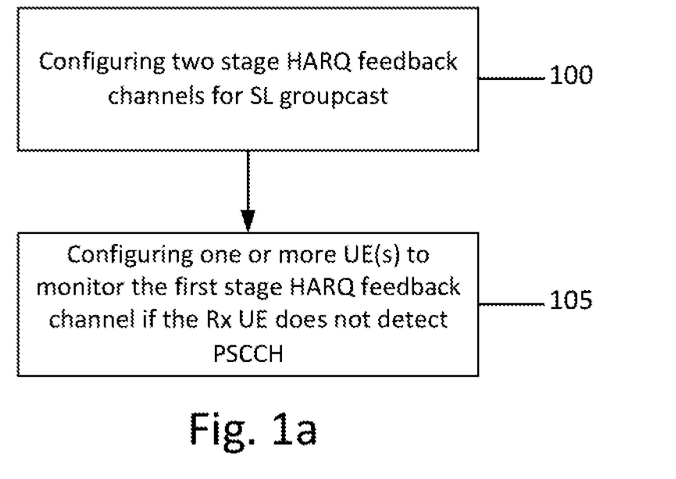
FIG. 1a illustrates an example flow diagram of a method, according to one embodiment.

FIG. 1a illustrates one example flow diagram depicting a two stage HARQ feedback method, according to an example embodiment. In certain example embodiments, the flow diagram of FIG. 1a may be performed by a network entity or network node in a 3GPP system, such as LTE or 5G NR. For instance, in some example embodiments, the method of FIG. 1a may be performed by a base station, eNB, or gNB. Alternatively, the flow diagram of FIG. 1a may be performed by a user equipment (UE) in a 3GPP system, such as LTE or 5G NR. For instance, in some example embodiments, the method of FIG. 1a may be performed by a UE that acts as the group head or leader of the groupcast. For another instance, in some example embodiments, the method of FIG. 1a may be performed by a transmitting UE (Tx UE) of the groupcast.

As illustrated in the example of FIG. 1a, the method may include, at 100, configuring two stage HARQ feedback channels for SL groupcast. In one embodiment, the configuring 100 may include configuring the two stage HARQ feedback channels during groupcast communication establishment and/or when a Rx UE joins the SL groupcast. According to certain embodiments, a first stage of the two stage HARQ feedback channels may be shared by all the Rx UEs in the groupcast and a second stage of the two stage HARQ feedback channels may be shared by all the Rx UEs or dedicated to each individual UE in the groupcast.

In some embodiments, the method may also include, at 105, configuring one or more Rx UE(s) to monitor the first stage HARQ feedback channel if the Rx UE does not detect PSCCH to indicate there is SL data transmission on PSSCH for the groupcast.

Figure 1B:
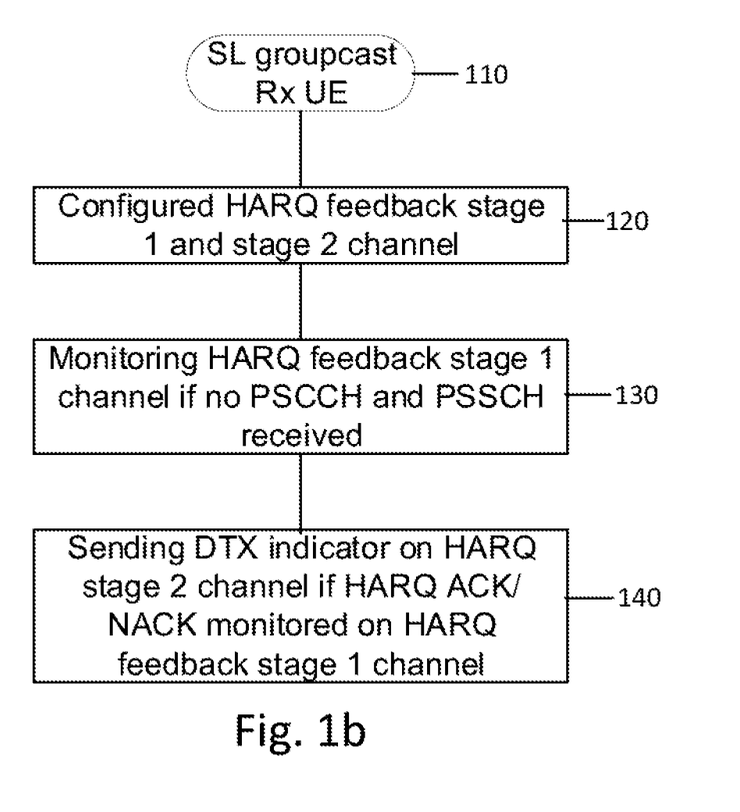
FIG. 1b illustrates another example flow diagram of a method, according to one embodiment.

FIG. 1b illustrates one example flow diagram depicting a two stage HARQ feedback method, which may be performed by a Rx UE in a SL groupcast, according to some embodiments. As illustrated in the example of FIG. 1b, the method may begin with a Rx UE in SL groupcast at 110. In an embodiment, at 120, the Rx UE may be configured with HARQ feedback stage 1 and stage 2 channel. The method may also include, at 130, monitoring HARQ feedback stage 1 channel if no PSCCH and PSSCH is received. The method may further include, at 140, sending DTX indicator on HARQ stage 2 channel if HARQ ACK/NACK monitored on HARQ feedback stage 1 channel.

According to some embodiments, the configured two stage HARQ feedback channels may be implemented by layer 1 (L1) sequences in such a way that a first L1 sequence of HARQ ACK and a second L1 sequence of HARQ NACK may be configured as stage 1 HARQ feedback channels, and a third L1 sequence of DTX indicator may be configured as stage 2 HARQ feedback channels. In addition to the L1 sequences, in an embodiment, the time-frequency domain resources of PSFCH may be configured as well.

In one embodiment, the configured two stage HARQ feedback channels may be implemented by extended PSFCH channels in which HARQ ACK/NACK feedback channel for one or multi-bits indication is configured as stage 1 HARQ feedback channel and the extended SL feedback channel for DTX indicator and other SL feedback information, such as CSI, is configured as stage 2 HARQ feedback channel.

According to an example embodiment, the configured stage 1 feedback channel may be shared by all the UEs in the groupcast to make it easier for Rx UEs to know where to monitor the stage 1 feedback channel. The shared stage 1 feedback channel can provide the benefits of resource efficiency, especially for a large group of UEs in the SL groupcast.

In one embodiment, the configured stage 1 feedback channel may be shared by the UEs with the same CSI. In this embodiment, multiple stage 1 feedback channels, of which each channel corresponds to one CSI, may be configured. The CSI specific stage 1 feedback channel may be used to report HARQ ACK/NACK or at least NACK by the Rx UEs with the measured CSI. In this way, the CSI report may be implicitly indicated by the stage 1 feedback channel on which the HARQ ACK/NACK is transmitted. Based on such information, the Tx UE can make the link adaption for HARQ retransmission.

According to certain embodiments, the configured stage 2 feedback channel may be either shared by all the UEs in the groupcast and/or dedicated to each individual UE in the SL groupcast. The sharing of the stage 2 feedback channel by all of the UEs may be preferable if only DTX indicator is provided in the stage 2 feedback channel. The dedication of the stage 2 feedback channel to each individual UE may be needed if further extended feedback information, such as CSI, is also included in the stage 2 feedback channel as the reported CSI from different UEs may be different to make it not possible to share the same feedback channel. In some embodiments, the same option described above for CSI specific stage 1 feedback channel may also be applied for stage 2 feedback channel.

In one embodiment, the SL groupcast UEs may be configured to monitor the stage 1 feedback channel if the UE does not detect PSCCH indicating there is SL groupcast data transmitted over PSSCH targeted to the group that the UE belongs to. The monitoring of the stage 1 feedback channel may be based on received power of the channel, e.g., the HARQ ACK/NACK feedback is detected if the received power of the configured stage 1 feedback channel is higher than configured threshold. Alternatively, the stage 1 feedback channel may be monitored by decoding the channel to detect whether HARQ ACK or NACK is transmitted by the other Rx UEs in the groupcast.

According to some embodiments, the SL groupcast Rx UE may be configured to send HARQ DTX or NACK on configured stage 2 feedback channel if the Rx UE detects HARQ ACK/NACK feedback transmitted from the other Rx UEs of the SL groupcast on stage 1 feedback channel. In addition to HARQ DTX/NACK indication, the other feedback information, such as CSI, may also be included on the stage 2 feedback channel.

In one example embodiment, the SL groupcast Rx UE may be configured to send HARQ DTX or NACK on configured stage 2 feedback channel only if the Rx UE detects HARQ ACK from other Rx UEs sending on stage 1 feedback channel. In this example, if HARQ NACK is detected on stage 1 feedback channel, the Rx UE may not send the HARQ DTX or NACK over stage 2 feedback channel as HARQ retransmission will be triggered anyway from Tx UE by the HARQ NACK from the other Rx UEs. However, this option does not allow the Tx UE to be aware of the DTX and therefore is not able to adapt the PSCCH transmission to make it more reliable to avoid DTX.

Figure 2A:
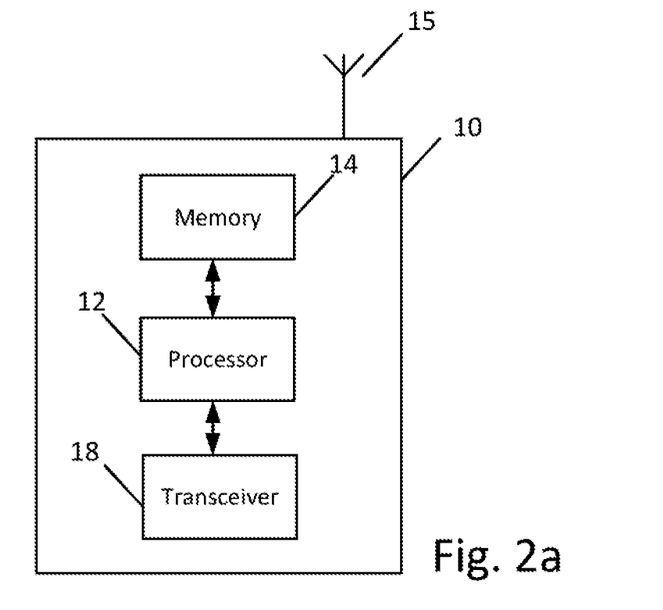
FIG. 2a illustrates an example block diagram of an apparatus, according to one embodiment.

FIG. 2a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be an eNB in LTE or gNB in 5G. In other example embodiments, apparatus 10 may be a UE in a 3GPP system, such as LTE or 5G NR. For instance, in some example embodiments, apparatus 10 may be a UE that acts as the group head or leader of the groupcast. For instance, in some example embodiments, apparatus 10 may be a transmitting UE (Tx UE) of the groupcast.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 2a.

As illustrated in the example of FIG. 2a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 2a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. In other example embodiments, apparatus 10 may be a UE (e.g., Tx UE), such as a UE that acts as the group head or leader of the groupcast. According to certain embodiments, apparatus 10 may be controlled by memory 14 and processor 12 to perform the functions associated with any of the embodiments described herein, such as the flow or signaling diagrams illustrated in FIGS. 1a or 1b. In some embodiments, apparatus 10 may be configured to perform a procedure for two stage HARQ feedback, for example.

For instance, in one embodiment, apparatus 10 may be controlled by memory 14 and processor 12 to configure two stage HARQ feedback channels for SL groupcast. In one embodiment, apparatus 10 may be controlled by memory 14 and processor 12 to configure the two stage HARQ feedback channels during groupcast communication establishment and/or when a Rx UE joins the SL groupcast. According to certain embodiments, a first stage of the two stage HARQ feedback channels may be shared by all the Rx UEs in the groupcast and a second stage of the two stage HARQ feedback channels may be shared by all the Rx UEs or dedicated to each individual UE in the groupcast.

In some embodiments, apparatus 10 may be controlled by memory 14 and processor 12 to configure one or more Rx UE(s) to monitor the first stage HARQ feedback channel if the Rx UE does not detect PSCCH to indicate there is SL data transmission on PSSCH for the groupcast.

According to some embodiments, apparatus 10 may be controlled by memory 14 and processor 12 to configure the two stage HARQ feedback channels as L1 sequences in such a way that a first L1 sequence of HARQ ACK and a second L1 sequence of HARQ NACK are configured as stage 1 HARQ feedback channels, and a third L1 sequence of DTX indicator are configured as stage 2 HARQ feedback channels. In an embodiment, apparatus 10 may be controlled by memory 14 and processor 12 to also configure the time-frequency domain resources of PSFCH.

In one embodiment, apparatus 10 may be controlled by memory 14 and processor 12 to implement the configured two stage HARQ feedback channels by extended PSFCH channels in which HARQ ACK/NACK feedback channel for one or multi-bits indication is configured as stage 1 HARQ feedback channel and the extended SL feedback channel for DTX indicator and other SL feedback information, such as CSI, is configured as stage 2 HARQ feedback channel.

According to an example embodiment, apparatus 10 may be controlled by memory 14 and processor 12 to configure the stage 1 feedback channel to be shared by all the UEs in the groupcast. In one embodiment, apparatus 10 may be controlled by memory 14 and processor 12 to configure the stage 1 feedback channel to be shared by the UEs with the same CSI. In this embodiment, apparatus 10 may be controlled by memory 14 and processor 12 to configure multiple stage 1 feedback channels of which each channel corresponds to one CSI. The CSI specific stage 1 feedback channel may be used to report HARQ ACK/NACK or at least NACK by the Rx UEs with the measured CSI. Based on such information, the Tx UE can make the link adaption for HARQ retransmission.

According to certain embodiments, apparatus 10 may be controlled by memory 14 and processor 12 to configure the stage 2 feedback channel to be shared by all the UEs in the SL groupcast and/or dedicated to each individual UE in the SL groupcast.

In one embodiment, apparatus 10 may be controlled by memory 14 and processor 12 to configure the SL groupcast UEs to monitor the stage 1 feedback channel if the UE does not detect PSCCH indicating there is SL groupcast data transmitted over PSSCH targeted to the group that the UE belongs to. The monitoring of the stage 1 feedback channel may be based on received power of the channel, e.g., the HARQ ACK/NACK feedback is detected if the received power of the configured stage 1 feedback channel is higher than configured threshold. Alternatively, the stage 1 feedback channel may be monitored by decoding the channel to detect whether HARQ ACK or NACK is transmitted by the other Rx UEs in the groupcast.

According to some embodiments, apparatus 10 may be controlled by memory 14 and processor 12 to configure the SL groupcast Rx UE to send HARQ DTX or NACK on configured stage 2 feedback channel if the Rx UE detects HARQ ACK/NACK feedback transmitted from the other Rx UEs of the SL groupcast on stage 1 feedback channel. In addition to HARQ DTX/NACK indication, the other feedback information, such as CSI, may also be included on the stage 2 feedback channel.

In one example embodiment, apparatus 10 may be controlled by memory 14 and processor 12 to configure the SL groupcast Rx UE to send HARQ DTX or NACK on configured stage 2 feedback channel only if the Rx UE detects HARQ ACK from other Rx UEs sending on stage 1 feedback channel. In this example, if HARQ NACK is detected on stage 1 feedback channel, the Rx UE is configured to not send the HARQ DTX or NACK over stage 2 feedback channel as HARQ retransmission will be triggered anyway from Tx UE by the HARQ NACK from the other Rx UEs.

Figure 2B:
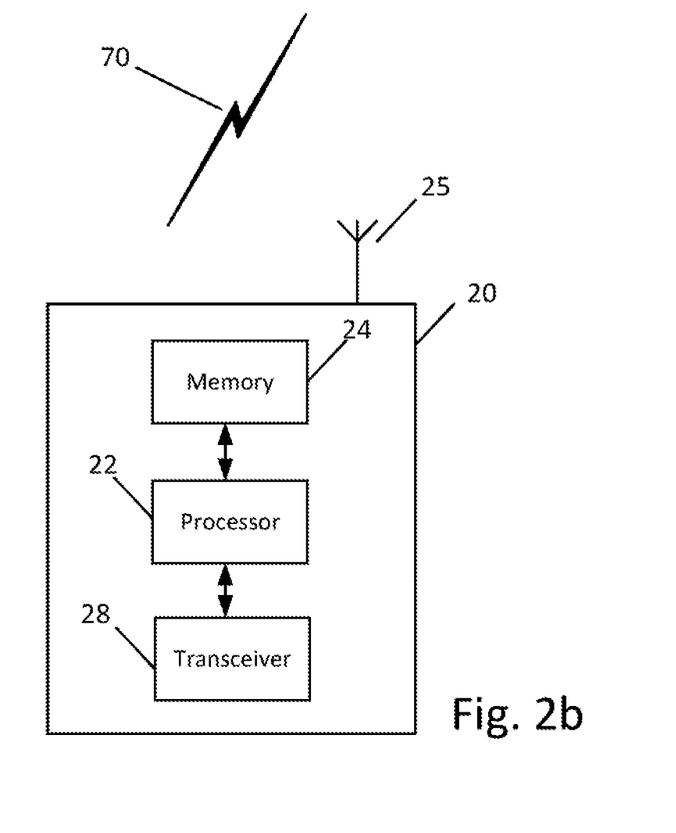
FIG. 2b illustrates another example block diagram of an apparatus, according to one embodiment.

FIG. 2b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 2b.

As illustrated in the example of FIG. 2b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 2b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIGS. 1a or 1b. For example, in certain embodiments, apparatus 20 may be configured to perform a procedure two stage HARQ feedback, for instance.

According to some embodiments, apparatus 20 may be controlled by memory 24 and processor 22 to receive a configuration of HARQ feedback stage 1 channel and stage 2 channel. In an embodiment, apparatus 20 may be controlled by memory 24 and processor 22 to monitor HARQ feedback stage 1 channel if no PSCCH and PSSCH is received. According to an embodiment, apparatus 20 may be controlled by memory 24 and processor 22 to send DTX indicator on HARQ stage 2 channel if HARQ ACK/NACK is monitored on HARQ feedback stage 1 channel.

Therefore, certain example embodiments provide several technical improvements, enhancements, and/or advantages. For example, certain embodiments help provide HRLLC, for example, in order to support advanced V2X cases. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

A first embodiment is directed to a method that may include configuring, by a network node or a UE, two stage HARQ feedback channels for SL groupcast. The method may also include configuring one or more UE(s) (of the SL groupcast) to monitor a first stage of the two stage HARQ feedback channels when the UE(s) does not detect PSCCH to indicate there is SL data transmission on PSSCH for the groupcast.

In a variant, the method of the first embodiment may be performed by a network node, such as a base station, eNB and/or gNB.

In a variant, the method of the first embodiment may be performed by a Tx UE and/or a UE that acts as group head of the groupcast.

In a variant, the configuring of the two stage HARQ feedback channels may include configuring the two stage HARQ feedback channels during groupcast communication establishment and/or when a Rx UE joins the SL groupcast.

In a variant, a first stage of the two stage HARQ feedback channels may be shared by all the UEs in the groupcast, and/or a second stage of the two stage HARQ feedback channels may be shared by all the UEs or dedicated to each individual UE in the groupcast.

A second embodiment is directed to a method that may include monitoring, by a UE in SL groupcast configured with two stage HARQ feedback channels, the first stage HARQ feedback channel when no PSCCH and PSSCH is received. The method may further include sending a DTX indicator on the second stage HARQ feedback channel when HARQ ACK/NACK is monitored on the first stage HARQ feedback channel.

In a variant, the configured two stage HARQ feedback channels may be implemented by L1 sequences such that a first L1 sequence of HARQ ACK and a second L1 sequence of HARQ NACK may be configured as first stage HARQ feedback channels, and a third L1 sequence of DTX indicator may be configured as second stage HARQ feedback channels.

In a variant, the configured two stage HARQ feedback channels may be implemented by extended PSFCH channels in which HARQ ACK/NACK feedback channel for one or multi-bits indication is configured as the first stage HARQ feedback channel and the extended SL feedback channel for DTX indicator and other SL feedback information is configured as the second stage HARQ feedback channel.

In a variant, the configured first stage feedback channel may be shared by all the UEs in the groupcast.

In a variant, the configured second stage feedback channel may be shared by all the UEs in the groupcast and/or dedicated to each individual UE in the SL groupcast.

In a variant, the configured first stage feedback channel and/or the configured second stage feedback channel may be shared by the UEs with the same CSI.

In a variant, a plurality of first stage feedback channels and/or second stage feedback channels, of which each channel corresponds to one CSI, may be configured. In a further variant, the CSI specific first stage feedback channel and/or second feedback channel may be used to report HARQ ACK/NACK or at least NACK or DTX by the UEs along with the measured CSI.

In a variant, the UE(s) may be configured to monitor the first stage feedback channel when the UE(s) does not detect PSCCH indicating there is SL groupcast data transmitted over PSSCH targeted to the group that the UE belongs to.

In a variant, the monitoring of the first stage feedback channel may be based on received power of the channel. In another variant, the first stage feedback channel may be monitored by decoding the channel to detect whether HARQ ACK or NACK is transmitted by other UEs in the groupcast.

In a variant, the UE(s) may be configured to send HARQ DTX or NACK on the configured second stage feedback channel when the UE(s) detects HARQ ACK/NACK feedback transmitted from the other UEs of the SL groupcast on the first stage feedback channel.

In a variant, the UE(s) may be configured to send HARQ DTX or NACK on the configured second stage feedback channel only when the UE(s) detects HARQ ACK from other UEs sending on the first stage feedback channel.

Another embodiment is directed to an apparatus including at least one processor and at least one memory comprising computer program code. The at least one memory and computer program code may be configured, with the at least one processor, to cause the apparatus at least to perform the method according to the first embodiment or second embodiment or any of their variants discussed above.

Another embodiment is directed to an apparatus that may include circuitry configured to perform the method according to the first embodiment or the second embodiment or any of their variants.

Another embodiment is directed to an apparatus that may include means for performing the method according to the first embodiment or the second embodiment or any of their variants.

Another embodiment is directed to a computer readable medium comprising program instructions stored thereon for performing at least the method according to the first embodiment or the second embodiment or any of their variants.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

What is claimed is:

1. A method, comprising:
monitoring, by a user equipment in a sidelink groupcast group configured with two stages hybrid automatic repeat request feedback channels, a first stage hybrid automatic repeat request feedback channel if no physical sidelink control channel and physical sidelink shared channel is received by the user equipment, wherein the monitoring comprises decoding the first stage hybrid automatic repeat request feedback channel to detect whether hybrid automatic repeat request feedback positive acknowledgement or negative acknowledgement is transmitted by other user equipment in the groupcast group in response to a sidelink groupcast transmission; and
sending a discontinuous transmission indicator or hybrid automatic repeat request negative acknowledgement on a second stage hybrid automatic repeat request feedback channel when hybrid automatic repeat request positive acknowledgement/negative acknowledgement from another user equipment in the broadcast group is detected while monitoring on the first stage hybrid automatic repeat request feedback channel.

2. The method according to claim 1, wherein the configured two stage hybrid automatic repeat request feedback channels are implemented by layer 1 sequences such that a first layer 1 sequence of hybrid automatic repeat request positive acknowledgement and a second layer 1 sequence of hybrid automatic repeat request negative acknowledgement are configured as the first stage hybrid automatic repeat request feedback channels, and a third layer 1 sequence of the discontinuous transmission indicator or hybrid automatic repeat request negative acknowledgement is configured as the second stage hybrid automatic repeat request feedback channels.

3. The method according to claim 1, wherein the configured two stage hybrid automatic repeat request feedback channels are implemented by extended physical sidelink feedback channels in which hybrid automatic repeat request positive acknowledgement/negative acknowledgement feedback channel for one or multi-bits indication is configured as the first stage hybrid automatic repeat request feedback channel and the extended physical sidelink feedback channel for the discontinuous transmission indicator or hybrid automatic repeat request negative acknowledgement and other sidelink feedback information is configured as the second stage hybrid automatic repeat request feedback channel.

4. The method according to claim 1, wherein the configured first stage hybrid automatic repeat request feedback channels is shared by all user equipments in the sidelink groupcast.

5. The method according to claim 1, wherein the configured second stage hybrid automatic repeat request feedback channels are either shared by all user equipments or dedicated to each individual user equipment in the sidelink groupcast.

6. The method according to claim 1, wherein the first stage feedback channel is monitored by decoding the feedback channel to detect whether hybrid automatic repeat request positive acknowledgement or negative acknowledgement is transmitted by other user equipment in the groupcast.

7. The method according to claim 1, wherein the user equipment is configured to send hybrid automatic repeat request discontinuous transmission or negative acknowledgement on the configured second stage feedback channel when the user equipment detects hybrid automatic repeat request positive acknowledgement/negative acknowledgement feedback transmitted from other user equipment of the sidelink groupcast on the first stage feedback channel.

8. The method according to claim 1, wherein the user equipment is configured to send hybrid automatic repeat request discontinuous transmission or negative acknowledgement on the configured second stage feedback channel only when the user equipment detects hybrid automatic repeat request positive acknowledgement from other user equipment sending on the first stage feedback channel.

9. An apparatus for operating a user equipment, comprising:
at least one memory comprising computer program code;
at least one processor;
wherein the at least one memory and the computer program code are configured, with the at least one processor, to cause the apparatus at least to:
monitor, by the apparatus in a sidelink groupcast group configured with two stages hybrid automatic repeat request feedback channels, a first stage hybrid automatic repeat request feedback channel if no physical sidelink control channel and physical sidelink shared channel is received by the apparatus, wherein the monitoring comprises decoding the first stage hybrid automatic repeat request feedback channel to detect whether hybrid automatic repeat request feedback positive acknowledgement or negative acknowledgement is transmitted by other user equipment in the groupcast group in response to a sidelink groupcast transmission; and
send a discontinuous transmission indicator or hybrid automatic repeat request negative acknowledgement on a second stage hybrid automatic repeat request feedback channel when hybrid automatic repeat request positive acknowledgement/negative acknowledgement from another user equipment in the broadcast group is detected while monitoring on the first stage hybrid automatic repeat request feedback channel.

10. The apparatus according to claim 9, wherein the configured two stage hybrid automatic repeat request feedback channels are implemented by layer 1 sequences such that a first layer 1 sequence of hybrid automatic repeat request positive acknowledgement and a second layer 1 sequence of hybrid automatic repeat request negative acknowledgement are configured as the first stage hybrid automatic repeat request feedback channels, and a third layer 1 sequence of the discontinuous transmission indicator or hybrid automatic repeat request negative acknowledgement is configured as the second stage hybrid automatic repeat request feedback channels.

11. The apparatus according to claim 9, wherein the configured two stage hybrid automatic repeat request feedback channels are implemented by extended physical sidelink feedback channels in which hybrid automatic repeat request positive acknowledgement/negative acknowledgement feedback channel for one or multi-bits indication is configured as the first stage hybrid automatic repeat request feedback channel and the extended physical sidelink feedback channel for the discontinuous transmission indicator or hybrid automatic repeat request negative acknowledgement and other sidelink feedback information is configured as the second stage hybrid automatic repeat request feedback channel.

12. The apparatus according to claim 9, wherein the configured first stage hybrid automatic repeat request feedback channels is shared by all user equipments in the sidelink groupcast.

13. The apparatus according to claim 9, wherein the configured second stage hybrid automatic repeat request feedback channels are either shared by all user equipments or dedicated to each individual user equipment in the sidelink groupcast.

14. The apparatus according to claim 9, wherein at least one of the configured first stage feedback channel and the configured second stage feedback channel is shared by all user equipments in the sidelink groupcast with same sidelink channel status.

15. The apparatus according to claim 9, wherein the first stage feedback channel is monitored by decoding the feedback channel to detect whether hybrid automatic repeat request positive acknowledgement or negative acknowledgement is transmitted by other user equipment in the groupcast.

16. The apparatus according to claim 9, wherein the apparatus is configured to send hybrid automatic repeat request discontinuous transmission or negative acknowledgement on the configured second stage feedback channel when the apparatus detects hybrid automatic repeat request positive acknowledgement/negative acknowledgement feedback transmitted from other user equipment of the sidelink groupcast on the first stage feedback channel.

17. The apparatus according to claim 9, wherein the apparatus is configured to send hybrid automatic repeat request discontinuous transmission or negative acknowledgement on the configured second stage feedback channel only when the apparatus detects hybrid automatic repeat request positive acknowledgement from other user equipment sending on the first stage feedback channel.

* * * * *